Feb. 2, 1926.
W. A. SHARPE
ELECTRIC WATER HEATER
Filed Oct. 23, 1924
1,571,379
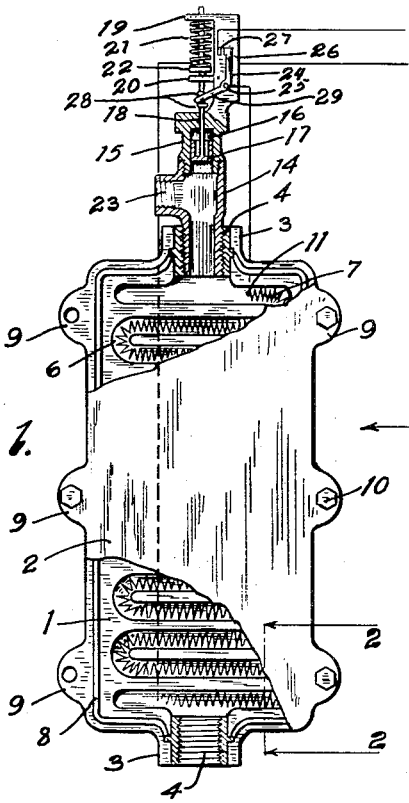
Fig. 1.
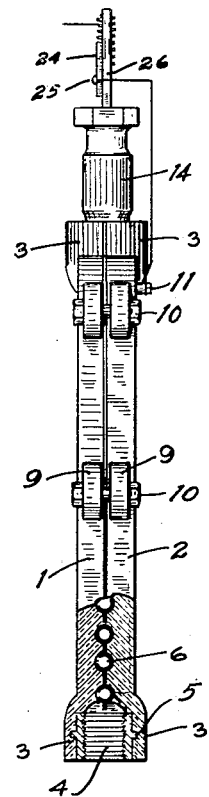
Fig. 2.
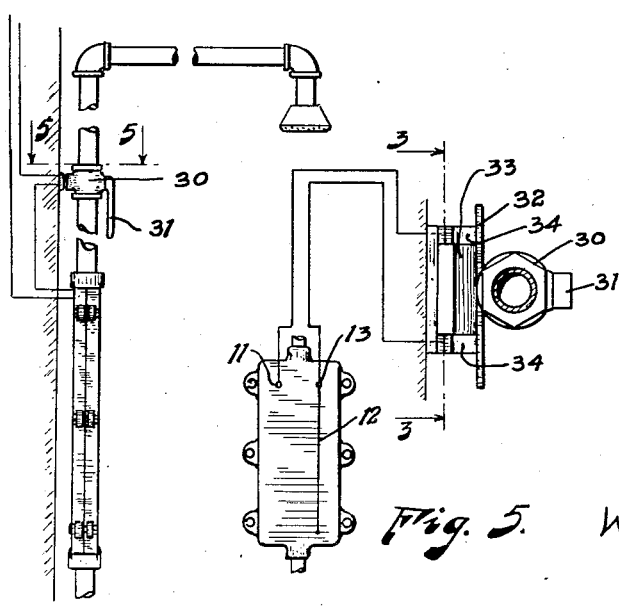
Fig. 5.
Fig. 6.
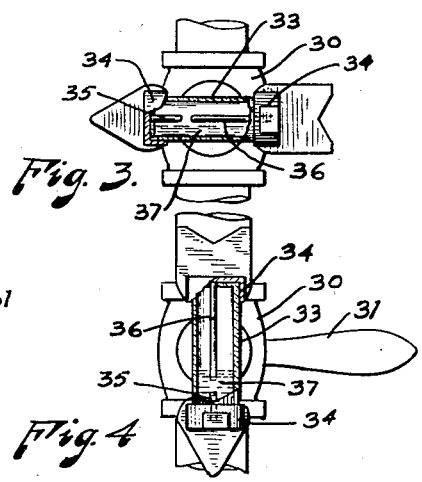
Fig. 3.
Fig. 4.
Inventor
William A. Sharpe.
By A. J. O'Brien
Attorney Patented Feb. 2, 1926.

1,571,379

UNITED STATES PATENT OFFICE.

WILLIAM A. SHARPE, OF DENVER, COLORADO.

ELECTRIC WATER HEATER.

Application filed October 23, 1924. Serial No. 745,360.

*To all whom it may concern:*

Be it known that I, WILLIAM A. SHARPE, a citizen of the United States, residing at the city and county of Denver and State of Colorado, have invented certain new and useful Improvements in Electric Water Heaters; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to electric heaters for use in heating water.

In our present state of civilization, we are in constant need of hot water for a variety of purposes, and many different arrangements have been provided for heating water conveniently, with the result that nearly all homes have a supply of hot water available for immediate use. It is evident that the simplest and most convenient way of producing heat is by means of an electric current, as such a source of heat is clean, odorless and easily controlled.

It is the object of this invention to produce an electric heating element that shall be especially well adapted for heating water, and which can be used as an "instantaneous" water heater to provide hot water for any purpose, but especially for baths.

It is a further object of this invention to produce an automatic pressure-operated switch that will close the electric circuit when water is drawn and to open the same when the water ceases to flow. When my heater is to be used in connection with shower baths, the switch may be mechanically connected to the handle and so related therewith that the circuit to the heater will be closed whenever the valve is opened and will remain closed as long as water is permitted to flow through the valve, but which will open the circuit whenever the valve is closed.

It is a still further object of this invention to produce a heater in which the water shall have a long path on which it is constantly subjected to heat from the electric resistance so that there will be an efficient transfer of heat to the water.

The above and other objects that will appear as the description proceeds, are obtained by means of a construction which I shall now describe in detail, reference for this purpose being had to the accompanying drawings in which the preferred embodiment of my invention is illustrated, and in which:

Fig. 1 is a view showing my improved heater, partly in elevation and partly in section;

Fig. 2 is a side elevation of the parts shown in Fig. 1 with a part thereof showing a section taken on line 2—2, Fig. 1;

Fig. 3 is a view taken along line 3—3, Fig. 5, and shows the switch element partly in section showing the switch in open position;

Fig. 4 is a view similar to that shown in Fig. 3 and shows the switch in circuit-closing position;

Fig. 5 is a section taken on line 5—5, Fig. 6, and shows one way of connecting the switch to the heater; and Fig. 6 is a view showing my heater connected to a shower bath.

My improved heater is preferably formed from two substantially identical porcelain members 1 and 2 of rectangular shape. Each one of these members is provided at opposite ends with semi-cylindrical projecting lugs 3, which when in assembled position, forms a cylindrical opening for the reception of the bushing 4. This bushing has an outwardly projecting flange 5 that cooperates with a corresponding groove in the inside surfaces of parts 3 for the purpose of holding the bushing against longitudinal movement. A zig-zag semi-circular groove 6 extends from one end opening to the other and when the parts are assembled, forms a circular opening for the resistance element 7 that is formed into an elongated helix which is put under sufficient tension to keep the adjacent coils out of contact. A groove 8 extends around the porcelain members 1 and 2 and serves for the reception of a suitable packing. Each of the members 1 and 2 have lugs or ears 9 that are provided with openings for the reception of the bolts 10, by means of which the parts are held in assembled position. One end of the resistance coil 7 is connected to the binding post 11 and the other end is connected by means of the strip 12 with the binding post 13. Secured to the bushing 3 at the upper end of the heater is a T 14. To the upper end of the T, I secure a fitting designated by numeral 15. This has a cylindrical opening 16 for the reception of the piston 17 that is movably mounted therein. A rod 18 is connected at its lower end to the piston and is slidably associated with the guides 19 and 20. A spring 21 surrounds the rod 16 and abuts its end against the underside of the guide lug 19 and the nut 22. This spring is under compression and tends to move rod 18 and piston 17 downwardly against the pressure of the water. It may be remarked here that the lower bushing is connected to the water supply and the side opening 23 of the T is connected to the discharge faucet (not shown). When the faucet is closed, the pressure to which the piston 17 is subjected is equal to the full pressure of the water supply. When the faucet is open and the water is flowing, the piston it subjected to a greatly reduced pressure. The tension of the spring is so adjusted by means of the nut 22 that it will move the piston 17 downwardly to the position shown in Fig. 1 when the water flows and move it upwardly substantially to the top of the piston chamber when the faucet is closed. I utilize the movement of the rod 18 for the purpose of opening and closing a switch that controls the current to the resistance coil. As an example of a switch mechanism that can be used for this purpose, I have shown a bent switch arm 24 that is pivoted at 25 to member 26 from which it is insulated. A contact 27 is located in the path of the arm 24. The rod 18 is provided with two collars spaced a short distance apart. The end 29 of the lever 24 projects between the collars 28. It is now evident that when the rod 18 moves upwardly as when the water exit is closed, then the arm 24 will be rotated clockwise about its pivot, which movement will cause the end thereof to move away from the contact 27. When the faucet is opened the pressure to which the piston is subjected will immediately decrease and the switch will close the circuit to the resistance element, which will then become hot and heat the water. The switch mechanism described above is illustration only and I contemplate employing a snap switch in lieu thereof, preferably a double pole tumbler type.

It is evident from the above description that I have produced a heater of a neat and pleasing design that can readily be connected in a water supply to a bathroom or sink and which will instantaneously heat water as it is required, the electric energy being automatically connected and disconnected as the occasion requires.

When the heater is to be employed in connection with a shower bath, I prefer to substitute for the automatic switch one that is controlled by the valve and in Figs. 3 to 6 I have shown such an arrangement. The valve 30 is preferably of the plug type and is operated by the handle 31. Secured to the rotating plug is a sheet of insulating material 32 to which a tubular member 33 of insulating material is connected. The member 33 is provided with metal-conducting caps 34 to which terminals 35 and 36 are connected. The terminal designated 36 is longer than terminal 35 and is spaced therefrom by a short gap. A quantity of mercury 37 is contained in the tubular member. When the valve is closed the member 33 is horizontal and the mercury is out of contact with either terminal, but when the valve is moved to open position the mercury bridges the gap between the terminals in the manner shown in Fig. 4. The mercury switch just described is connected in series with the resistance element, somewhat as shown in Figs. 5 and 6. When the valve is closed, the circuit is broken, but just as soon as the valve is opened, the circuit is closed and the heater becomes effective. The temperature of the water can be regulated by means of the valve 30. If the valve is opened only a small amount, the water will be hot and as the rate of flow is increased, the temperature decreases. The zigzag shape of the grooves 6 and the resistance element 7 is of great importance in this combination, as it gives a long passage without unduly increasing the size of the apparatus.

Particular attention is called to the combination shown in Figs. 1 and 2, as it produces a simple self-contained device that requires merely to be properly connected to a water and an electric current supply to function properly.

Having now described my invention, what I claim as new is:

1. An electric water heater, comprising, in combination, two complementary, substantially flat plates of insulating material each of which is provided with a groove extending in a zig zag path from one end to the other, each of said grooves having a substantially semi-circular cross-section, said grooves being so related that when the plates are placed so that the grooved sides are placed face to face, the grooves will register so as to form a cylindrical zig zag opening, a helical resistance member in said openings, means for securing said plates together and exposed terminals electrically connected with the resistance member.

2. An electric water heater, comprising in combination, two complementary, substantially flat plates of insulating material, each of which is provided with a groove extending in a zig zag path from one end to the other, each of said grooves having a substantially semi-circular cross-section, said grooves being so related that when the plates are placed so that the grooved sides are placed face to face, the grooves will register so as to form a cylindrical zig zag opening, said opening terminating at opposite ends of said plates in an enlarged section, a bushing in said section, means for securing said plates together, a helical resistance member in said zig zag opening and exposed terminals electrically connected to the ends of the said resistance member.

In testimony whereof I affix my signature.

WILLIAM A. SHARPE.